(12) United States Patent
Allyn et al.

(10) Patent No.: US 9,250,926 B2
(45) Date of Patent: Feb. 2, 2016

(54) PLATFORM EXTENSIBILITY FRAMEWORK

(75) Inventors: Barry Christopher Allyn, Snohomish, WA (US); Brian Scott Ruble, Bellevue, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 12/433,327

(22) Filed: Apr. 30, 2009

(65) Prior Publication Data

US 2010/0281392 A1 Nov. 4, 2010

(51) Int. Cl.
- G06F 9/44 (2006.01)
- G06T 15/20 (2011.01)
- G06T 11/00 (2006.01)
- G06F 9/445 (2006.01)

(52) U.S. Cl.
CPC .......... *G06F 9/4443* (2013.01); *G06F 9/44526* (2013.01); *G06T 11/001* (2013.01); *G06T 15/205* (2013.01)

(58) Field of Classification Search
CPC ..... G06T 15/205; G06T 15/00; G06T 11/001; G06F 9/4443; G06F 9/44526
USPC .......................................... 345/503, 506, 582
See application file for complete search history.

(56) References Cited

U.S. PATENT DOCUMENTS

| | | |
|---|---|---|
| 5,175,805 A | 12/1992 | Carrie |
| 5,228,119 A | 7/1993 | Mihalisin et al. |
| 5,461,708 A | 10/1995 | Kahn |
| 5,581,677 A | 12/1996 | Myers et al. |
| 5,859,958 A | 1/1999 | Chan et al. |
| 5,936,641 A | 8/1999 | Jain et al. |
| 5,972,987 A | 10/1999 | Reid et al. |
| 5,982,399 A | 11/1999 | Scully et al. |
| 6,023,279 A | 2/2000 | Sowizral et al. |
| 6,052,125 A | 4/2000 | Gardiner et al. |
| 6,243,172 B1 | 6/2001 | Gauthier et al. |
| 6,466,211 B1 | 10/2002 | Havre et al. |
| 6,523,074 B1 | 2/2003 | Dianda et al. |
| 6,529,900 B1 | 3/2003 | Patterson et al. |
| 6,747,650 B2 | 6/2004 | Turner et al. |
| 7,068,267 B2 | 6/2006 | Meanor et al. |
| 7,071,940 B2 | 7/2006 | Malik |

(Continued)

FOREIGN PATENT DOCUMENTS

| | | |
|---|---|---|
| CN | 1722092 A | 1/2006 |
| CN | 1924800 A | 3/2007 |

(Continued)

OTHER PUBLICATIONS

International Search Report and The Written Opinion of the International Searching Authority, or the Declaration dated Nov. 30, 2010 in PCT/US2010/032307 filed Apr. 23, 2010; 9 pages.

(Continued)

*Primary Examiner* — Ryan Pitaro
(74) *Attorney, Agent, or Firm* — Damon Rieth; Tom Wong; Micky Minhas

(57) ABSTRACT

A platform extensibility framework may be provided. A visualization platform may register feature extensions and receive requests to create objects. The objects may be created according to drawing instructions provided by the visualization platform, an application requesting the object's creation, and/or at least one of the feature extensions.

20 Claims, 3 Drawing Sheets

(56) References Cited

U.S. PATENT DOCUMENTS

| | | | |
|---|---|---|---|
| 7,176,919 B2* | 2/2007 | Drebin et al. | 345/426 |
| 7,176,923 B2 | 2/2007 | Vignet | |
| 7,404,194 B2 | 7/2008 | Wason et al. | |
| 7,454,439 B1 | 11/2008 | Gansner et al. | |
| 7,471,417 B1 | 12/2008 | Chien | |
| 7,586,500 B2 | 9/2009 | Herceg et al. | |
| 7,734,607 B2* | 6/2010 | Grinstein et al. | 707/705 |
| 7,765,182 B2 | 7/2010 | Peurach et al. | |
| 8,427,482 B2 | 4/2013 | Wallace et al. | |
| 8,638,343 B2 | 1/2014 | Allyn et al. | |
| 8,786,628 B2 | 7/2014 | Rampson et al. | |
| 2002/0199156 A1* | 12/2002 | Chess et al. | 716/1 |
| 2003/0061309 A1* | 3/2003 | Brown et al. | 709/218 |
| 2003/0151604 A1 | 8/2003 | Kaufman et al. | |
| 2003/0167278 A1 | 9/2003 | Baudel | |
| 2004/0036712 A1 | 2/2004 | Cardno | |
| 2004/0066384 A1 | 4/2004 | Ohba | |
| 2004/0183811 A1 | 9/2004 | Qi et al. | |
| 2004/0189668 A1* | 9/2004 | Beda et al. | 345/619 |
| 2004/0217956 A1 | 11/2004 | Besl et al. | |
| 2004/0233193 A1 | 11/2004 | Margadant | |
| 2005/0060300 A1 | 3/2005 | Stolte et al. | |
| 2005/0183003 A1* | 8/2005 | Peri | 715/507 |
| 2005/0253840 A1* | 11/2005 | Kwon | 345/419 |
| 2006/0017724 A1 | 1/2006 | Tsao | |
| 2006/0059414 A1 | 3/2006 | Cory et al. | |
| 2006/0066621 A1 | 3/2006 | Herceg et al. | |
| 2006/0202989 A1 | 9/2006 | Yinghui | |
| 2006/0236232 A1 | 10/2006 | Yuasa et al. | |
| 2006/0285152 A1 | 12/2006 | Skillen | |
| 2007/0101322 A1* | 5/2007 | Muschett et al. | 717/168 |
| 2007/0171716 A1 | 7/2007 | Wright et al. | |
| 2007/0174762 A1* | 7/2007 | Plant | 715/512 |
| 2007/0188494 A1 | 8/2007 | Agutter et al. | |
| 2007/0261100 A1 | 11/2007 | Greeson et al. | |
| 2008/0172629 A1 | 7/2008 | Tien et al. | |
| 2008/0180458 A1 | 7/2008 | Favart et al. | |
| 2008/0288306 A1 | 11/2008 | MacIntyre et al. | |
| 2008/0288889 A1 | 11/2008 | Hunt et al. | |
| 2009/0019429 A1 | 1/2009 | Randow et al. | |
| 2009/0021513 A1* | 1/2009 | Joshi et al. | 345/419 |
| 2009/0073187 A1 | 3/2009 | Rampson et al. | |
| 2009/0089453 A1 | 4/2009 | Bohan et al. | |
| 2009/0254827 A1* | 10/2009 | Gonze et al. | 715/716 |
| 2010/0162152 A1 | 6/2010 | Allyn et al. | |
| 2010/0251217 A1* | 9/2010 | Miller | 717/126 |
| 2010/0257474 A1* | 10/2010 | Bochatay et al. | 715/769 |
| 2010/0277507 A1 | 11/2010 | Allyn et al. | |
| 2010/0332994 A1* | 12/2010 | Istvan et al. | 715/740 |
| 2011/0015917 A1* | 1/2011 | Wang et al. | 703/23 |

FOREIGN PATENT DOCUMENTS

| | | |
|---|---|---|
| CN | 101146175 A | 3/2008 |
| JP | 2001-142711 A | 5/2001 |
| RU | 2 250 490 C2 | 4/2005 |
| RU | 2 321 892 C2 | 4/2008 |
| TW | I269189 | 12/2006 |
| WO | WO 2005/111873 A1 | 11/2005 |
| WO | WO 2010/126802 A2 | 11/2010 |
| WO | WO 2010/126803 A2 | 11/2010 |

OTHER PUBLICATIONS

International Search Report and The Written Opinion of the International Searching Authority, or the Declaration dated Nov. 30, 2010 in PCT/US2010/032308 filed Apr. 23, 2010; 9 pages.

Denkowski, M. et al., "Development of the Cross-Platform Framework for the Medical Image Processing," *Annales UMCS Informatica*, vol. AI 3, pp. 159-167 (2005).

Hill, B. et al., "An application Framework and Intelligent Graphic User Interface for Multiple Accelerator Codes," http://www.slac.stanford.edu/econf/C980914/papers/C-We21.pdf, 5 pages (1998).

Jern, M., "3D Data Visualization on the Web," *Proceedings of the 1998 Conference on MultiMedia Modeling*, pp. 90-99 (Oct. 12-15, 1998).

Millan, E. et al., "Imposters and pseudo-instancing for GPU crowd rendering," *Graphite*, pp. 49-55 (2006).

NetCharts Server, *Visual Mining, Inc.*, http://www.visualmining.com/products_for_developers/NetCharts_Server.php, pp. 1-4 (Copyright 2009).

Rusinkiewicz, S. et al., "QSplat: A Multiresolution Point Rendering System for Large Meshes," *SIGGRAPH*, pp. 343-352 (2000).

U.S. Appl. No. 12/433,288, filed Apr. 30, 2009, entitled "Data Visualization Platform Performance Optimization".

Xcelsius | XL, *Software Add-ons*, http://add-ons.co.uk/ product.aspx?name=Xcelsius%7CXL, pp. 1-3 (Copyright 2005).

U.S. Official Action dated May 9, 2011 for U.S. Appl. No. 12/049,280.

U.S. Official Action dated Dec. 15, 2011, for U.S. Appl. No. 12/433,288.

U.S. Official Action dated Jun. 30, 2011 for U.S. Appl. No. 12/433,288.

U.S. Official Action dated Oct. 12, 2011 for U.S. Appl. No. 12/049,280.

Li et al., Texture Partitioning and Packing for Accelerating Texture-Based Volume Rendering, Graphics Interface, 2003, vol. 81, pp. 1-10.

U.S. Official Action dated May 4, 2012 for U.S. Appl. No. 12/049,280.

U.S. Official Action dated Oct. 10, 2012 for U.S. Appl. No. 12/049,280.

Notice of Allowance dated Nov. 15, 2012 for U.S. Appl. No. 12/433,288.

U.S. Official Action dated Jun. 11, 2013 for U.S. Appl. No. 12/049,280.

Notice of Allowance dated May 22, 2013 for U.S. Appl. No. 12/433,288.

Chinese Office Action dated Jan. 31, 2013 in Application No. 201080019471.7, 8 pages.

Chinese Office Action dated May 23, 2013 in Application No. 201080019471.7, 8 pages.

Chinese Office Action dated Aug. 30, 2012 in Chinese Patent Application 201080019471.7 10 pages.

European Search Report dated Aug. 9, 2012 in European Application No. 10770165.8-1243/2425332 (PCT/US2010/032308), 5 pages.

Chilean Office Action dated Aug. 30, 2013 in Application No. 2655-2011, 11 pages.

U.S. Official Action dated Nov. 18, 2013 for U.S. Appl. No. 12/049,280, 14 pages.

"Plug-in to switch to IE rendering engine of any tab in the "Firefox", "IE Tab"", Published on: Jan. 16, 2006, Available at: http://www.forest.impress.co.jp/article/2006/01/16/ietab.html.

"Office Action Received in Australia Patent Application No. 2010241813", Mailed Dated: Mar. 27, 2014, 3 Pages.

"Office Action Received for Russian Federation Patent Application No. 2011143803", Mailed Dated: Feb. 28, 2014, 5 Pages). (w/o English Translation).

"Office Action Received for Australia Patent Application No. 2010241813", Mailed dated : Jul. 24, 2014, 3 Pages.

"Office Action Received in Japan Patent Application No. 2012-508555", Mailed Dated: May 19, 2014, 2 Pages. (w/o English Translation).

"Office Action Received in Chile Patent Application No. 2011-002656", Mailed Dated :Dec. 26, 2013, 7 Pages.

Russian Decision on Grant dated Sep. 15, 2014 in Application No. 2412-180536RU/4282 (No English Lang Translation).

Chinese Fourth Office Action dated Jul. 26, 2013 in Application No. 201080019471.7, 6 pgs.

Chinese Office Action dated Sep. 2, 2013 in Application No. 201080019475.5, 16 pgs.

Chilean Office Action dated Dec. 26, 2013 in Application No. 2656-2011; 11 pgs.

Australian Examination Report dated Mar. 26, 2014 in Application No. 2010241812, 3 pgs.

Australian Examination Report dated Mar. 27, 2014 in Application No. 2010241813, 3 pgs.

(56) References Cited

OTHER PUBLICATIONS

Chinese Second Office Action dated May 13, 2014 in Application No. 201080019475.5, 16 pgs.
Chilean Second Office Action dated Jun. 4, 2014 in Application No. 2655-2011; 9 pgs.
Russian Decision on Grant dated Nov. 25, 2014 in Application No. 2412-180535RU/8132 (No English Lang Translation), 13 pgs.
Taiwan Office Action dated Feb. 24, 2015 in Application No. 099108781; 9 pgs.

* cited by examiner

PLATFORM EXTENSIBILITY FRAMEWORK

RELATED APPLICATIONS

Related U.S. patent application Ser. No. 12/433,288, now U.S. Pat. No. 8,638,343, filed on Apr. 30, 2009 and entitled "Data Visualization Platform Performance," as well as related U.S. patent application Ser. No. 12/049,280, now U.S. Pat. No. 8,786,628, filed on Mar. 15, 2008 and entitled "Rendering Electronic Chart Objects," assigned to the assignee of the present application, are hereby incorporated by reference.

BACKGROUND

Platform extensibility provides a framework for allowing feature plug-ins to communicate with software applications. In some situations, product release schedules may dictate when new features may be incorporated into an application. For example, a new application version may be released on an annual basis, but users may request new features more frequently. Thus, the conventional strategy is to incorporate selected features in each scheduled release. This often causes problems because the conventional strategy is not always responsive to user demand. For example, a requested feature may take years to be incorporated into an application release and may result in customer dissatisfaction.

SUMMARY

A platform extensibility framework may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A platform extensibility framework may be provided. A visualization platform may register feature extensions and receive requests to create objects. The objects may be created according to drawing instructions provided by the visualization platform, an application requesting the object's creation, and/or at least one of the feature extensions.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
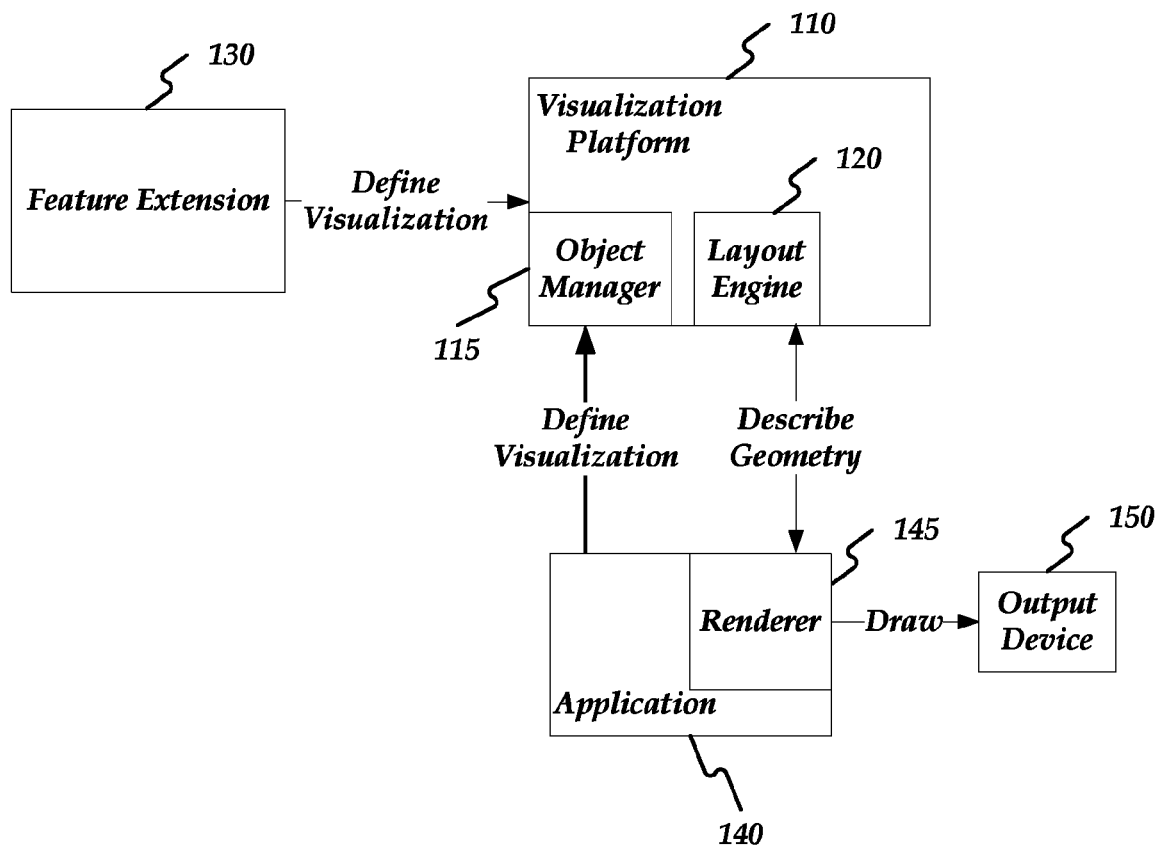
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A platform extensibility framework may be provided. Consistent with embodiments of the present invention, a visualization platform may provide an intermediary between user applications and add-ons that provide extended features. Add-ons may be developed by third parties and used by any application comprising support for the visualization platform without needing to wait for a formal product release.

FIG. 1 is a block diagram of an operating environment 100 for providing a visualization platform 110. Visualization platform 110 may comprise an object manager 115 and a layout engine 120. Visualization platform 110 may comprise an architecture allowing the creation of a data visualization, such as a chart, and may expose an interactive feature on the visualization. The architecture may provide integration with multiple rendering platforms. When a user selects the exposed feature, the architecture may translate the selection into a common format and modify the data visualization according to layout rules independent of the rendering platform.

Operating environment 100 may further comprise a feature extension 130, an application 140 comprising a rendering component 145, and a output device 150. Feature extension 130 may comprise, for example, a functionality add-on providing a drawing instruction override, additional data, and/or additional drawing elements. Application 140 may comprise, for example, a user application such as a word processing application, a spreadsheet application, a web browser, an email application, and/or other software application. Output device 150 may comprise, for example, a screen, a printer, an electronic document, and/or a web page.

Visualization platform 110 may comprise a shared core comprising software libraries and/or utilities for providing interactive visualizations. The shared core may be implemented, for example, in C++ or C#, and may be platform independent. The shared core may comprise visualization utilities for providing layouts, shapes and/or geometry, line services, 3-dimensional rendering, animation frame generation, and/or interactive hotspots. Visualization platform 110 may further comprise application programming interfaces (APIs) for interacting with application 140 and/or feature extension 130.

Application 140 and feature extension 130 may interface with visualization platform 110 to create objects in memory that may be rendered to output device 150 by application 140. Feature extension 130 may interface with visualization platform 130 rather than directly with application 140. Application 140 and feature extension 130 may be allowed to create the object together in a cooperative and independent manner. For example, application 140 may create a chart object with associated data bindings and feature extension 130 may create a legend and a series of data objects. Consistent with embodiments of the invention, feature extension 130 may create the object but leave it up to application 140 to provide the data.

Operating system independence by operating environment 100 may be supported by a plurality of versions of visualization platform 110. Visualization platform 110 may be implemented using a platform-independent code, such as in a dynamically linked library (DLL) implemented using the NET protocols developed by Microsoft Corporation of Redmond, Wash. Thus, feature extension 130 may comprise an addon that may be operative on any operating system supporting the platform-independent code. Consistent with embodiments of the invention, applications may not support the platform-independent code but may support the use of platform-independent feature extension 130 through the use of an operating system specific version of visualization platform 110.

Figure 2:
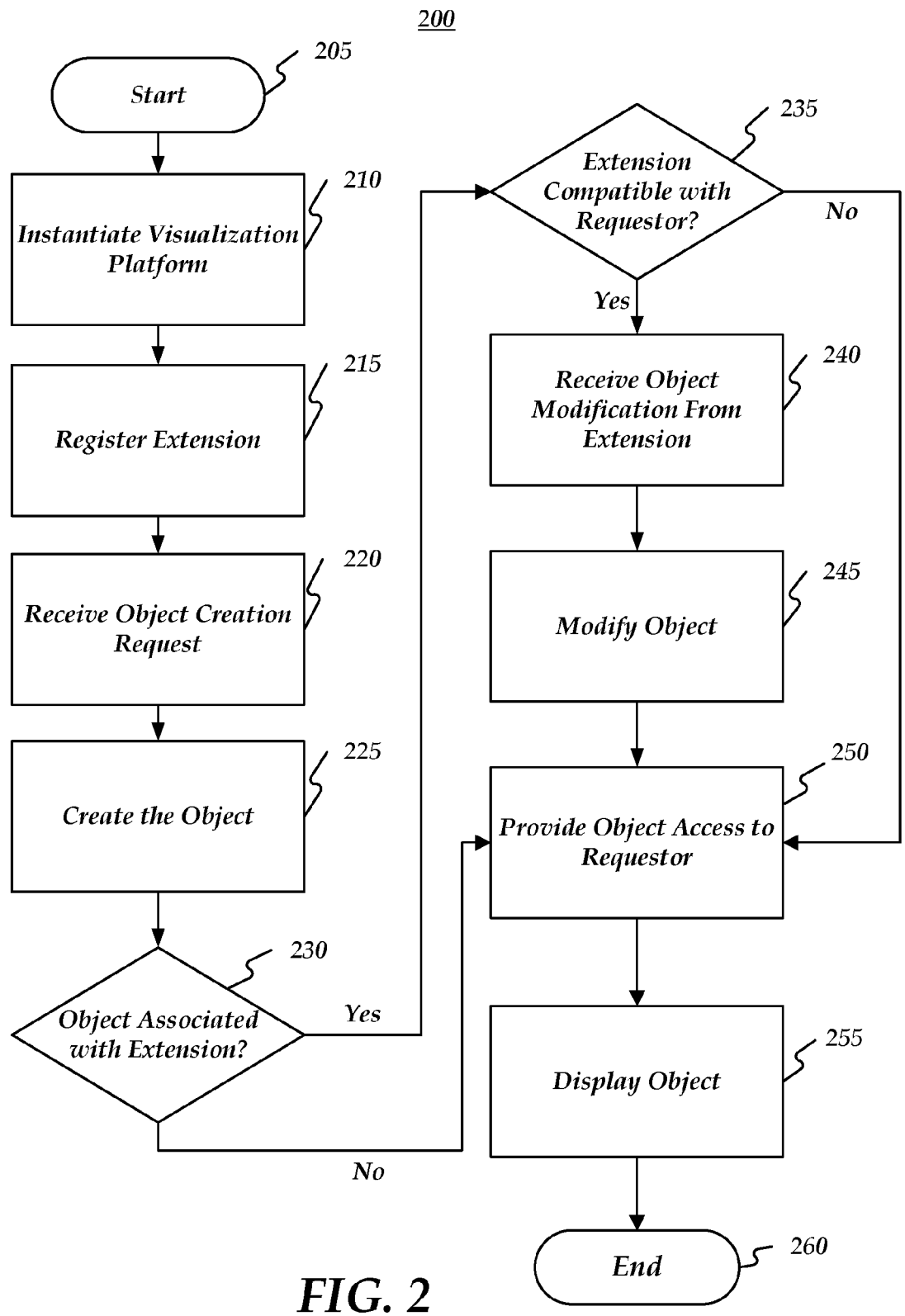
FIG. 2 is a flow chart of a method for providing a platform extensibility framework.

FIG. 2 is a flow chart setting forth the general stages involved in a method 200 consistent with an embodiment of the invention for providing a platform extensibility framework. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may instantiate a visualization platform. For example, computing device 300 may instantiate visualization platform 110 comprising a single code base operative to run in multiple environments and/or operating systems.

From stage 210, where computing device 300 instantiated, method 200 may advance to stage 215 where computing device 300 may register at least one feature extension with the visualization platform. For example, computing device 300 may locate feature extension 130 stored in a common memory location designated for feature extensions and feature extension 130 may provide details regarding available functionality to visualization platform 110. Consistent with embodiments of the invention, visualization platform 110 may determine and provide a list of objects that visualization platform 110 is operative to create. The list of createable objects may comprise objects for which drawing instructions are available from at least one of visualization platform 110, feature extension 130, and/or application 140.

Once computing device 300 registers the at least one feature extension in stage 215, method 200 may continue to stage 220 where computing device 300 may receive a request to create an object. For example, visualization platform 110 may receive a request from application 140 to create an object, such as a chart, a graph, a picture, and/or a multimedia object. The request may comprise an object type, a data structure, at least one drawing instruction, a data series, and/or at least one data value.

After computing device 300 receives the request to create the object in stage 220, method 200 may proceed to stage 225 where computing device 300 may create the object. For example, object manager 115 of visualization platform 110 may create the object according to at least one default drawing instruction associated with visualization platform 110 for an object of a requested type.

From stage 225, method 200 may proceed to stage 230 where computing device 300 may determine whether the requested object is associated with at least one feature extension. For example, computing device 300 may determine whether the creation and/or modification of the requested object may make use of a drawing instruction, a data value, and/or another provided functionality that may be provided by feature extension 130. If the requested object is determined not to be associated with the at least one feature extension, method 200 may advance to stage 250 where computing device 300 may provide access to the created object to the requesting application as described in greater detail below.

If, at stage 230, computing device 300 determines that the requested object is associated with the at least one feature extension, method 200 may advance to stage 235 where computing device 300 may determine whether the at least one feature extension is compatible with the requester. For example, application 140 may request the creation of a chart object by visualization platform 110 that may request use of a data series provided by feature extension 130. Visualization platform 110 may verify the compatibility between the requested chart object and the requested data series. Consistent with embodiments of the invention, verifying compatibility may comprise validating that the requested data series is designated for use with a chart object of the requested type. Further consistent with embodiments of the invention, visualization platform 100 may verify that application 140 comprises a compatible version with feature extension 130 and/or visualization platform 110. For example, visualization platform 110 may verify that application 140 comprises a version release number (e.g. 2.0), of a designated value or higher, and/or that application 140 comprises a particular release tier (e.g. Standard, Professional, Home, Business, and/or Educational). Visualization platform 110 may also verify whether application 140 comprises a valid license to make use of feature extension 130.

If, at stage 235, computing device 300 determines that the at least one feature extension is not compatible with the requesting application, method 200 may advance to stage 250, described below. If computing device 300 determines that the at least one feature extension is compatible with the requesting application, method 200 may advance to stage 240 where computing device 300 may receive at least one object modification from the at least one feature extension. Consistent with embodiments of the invention, feature extension 130 may add, remove, and/or override at least one drawing instruction provided by visualization platform 110 and/or application 140 for the creation of the requested object. For example, feature extension 130 may provide a legend, a background, and/or an additional data value and/or data series to be added to a chart object. Further consistent with embodiments of the invention, feature extension 130 may provide drawing instructions comprising alternate shape geometry for data points on a chart object that override drawing instructions for the shape geometry as provided by application. For example, feature extension 130 may provide drawing instructions comprising an octagon shape for use as a data point on a chart object instead of a default circular shape provided by application 140. As another example, feature extension 130 may provide overriding drawing instructions for modifying the object such as by re-drawing a chart as a log scale rather than a linear scale and/or using a split axis.

From stage 240, where computing device 300 received at least one object modification, method 200 may advance to stage 245 where computing device 300 may modify the object in accordance with the received modification. For example, visualization platform 110 may draw a new element or redraw an already drawn element of the created object. Consistent with embodiments of the invention, visualization platform 110 may receive modifications from feature extension 130 and/or application 140 and may modify the object accordingly. For example, visualization platform 110 may create a chart object with a displayed data value according to a request from application 140, add a data series according to a modification received from feature extension 130, and modify a color of the data series displayed on the object according to a modification received from application 140.

From stage 245, method 200 may advance to stage 250 where computing device 300 may provide access to the created object to the requesting application. For example, visualization platform 110 may create the object in a memory location associated with the visualization platform and grant access to the memory location to feature extension 130 and/or application 140 using an application programming interface (API). Consistent with embodiments of the invention, visualization platform 110 may provide a copy of the object to the requestor rather than providing access to the object in the memory location associated with visualization platform 110.

From stage 250, method 200 may advance to stage 255 where computing device 300 may display the created object. For example, application 140 may access the created object and render it to display device 150 using rendering component 145. Rendering the object may comprise generating an image from a model associated with the object. The model associated with the object may comprise a description of three-dimensional objects in a data structure and may comprise geometry, viewpoint, texture, lighting, and/or shading information. The image may comprise a digital image or raster graphics image.

Once computing device 300 displays the object in stage 255, method 200 may then end at stage 260.

As an example of method 200, application 140 may request a chart object from visualization platform 110, wherein the request provides a chart type, at least one data value and/or data series. Visualization platform 110 may create the chart object and populate the chart object with a legend and a title according to drawing instructions associated with visualization platform 110. At stage 255, where application 140 renders the chart object, application 140 may ask visualization platform 110 to provide the shapes associated with the chart object. Application 140 may walk through the shapes and receive drawing instructions for each in order to render them to an output device such as a printer or display device 150. Feature extension 130 may override and/or extend all kinds of visual elements of the created object. For example, they may add a new series type such as a line series, a column, and/or a pie series. For another example, feature extension 130 may override a particular map shape, a legend, a title, a legend item, an axis, and/or the entire chart.

Each element and/or function provided by feature extension 130 may be associated with an element name, and those element names may be provided as part of providing the list of objects that visualization platform 110 may be operative to create. Visualization platform 110 may determine that the requested object is associated with feature extension 130 by including the element names associated with feature extension 130 in the object creation request. For example, application 140 may provide a drop-down of available charts and/or data series selectable by the user. Upon receiving the user's selection, application 140 may request the object be created by visualization platform 110, and visualization platform 110 may query each known feature extension such as feature extension 130 to determine whether the feature extension is associated with the named element. Once visualization platform 110 determines the applicable feature extension, visualization platform 110 may receive drawing instructions from the applicable feature extension for adding, updating, and/or modifying the named element.

An embodiment consistent with the invention may comprise a system for providing an extensibility framework. The system may comprise a memory storage and a processing unit coupled to the memory storage. The processing unit may be operative to instantiate a visualization platform, register at least one feature extension with the visualization platform, receive a request to create at least one object from at least one application, and create the at least one object, determining whether the request is associated with the at least one feature extension; in response to determining that the request is associated with the at least one feature extension: receiving at least one object modification from the at least one feature extension, and modifying the object according to the at least one object modification; and rendering the object on a display device.

Another embodiment consistent with the invention may comprise a system for providing application extensibility. The system may comprise a memory storage and a processing unit coupled to the memory storage. The processing unit may be operative to locate at least one feature extension operative for use with a visualization platform, receive a request to create at least one object from at least one user application, and create the at least one object. The system may determine whether the request is associated with the at least one feature extension, and in response to determining that the request is associated with the at least one feature extension, receive at least one object modification from the at least one feature extension and modify the object according to the at least one object modification. The system may then render the object on a display device.

Yet another embodiment consistent with the invention may comprise a system for providing an application extensibility framework. The system may comprise a memory storage and a processing unit coupled to the memory storage. The processing unit may be operative to instantiate a visualization platform, register at least one feature extension, provide a list of objects that the visualization platform is operative to create to an application, receive a request to create at least one of the list of objects from the application, and create the at least one requested object according to at least one drawing instruction provided by the visualization platform and associated with the requested object type. If the object is associated with a feature extension, and the feature extension is compatible with the at least one application, the system may be operative to receive at least one object modification from the at least one feature extension, modify the object according to the at least one object modification, and render the object on a display device.

Figure 3:
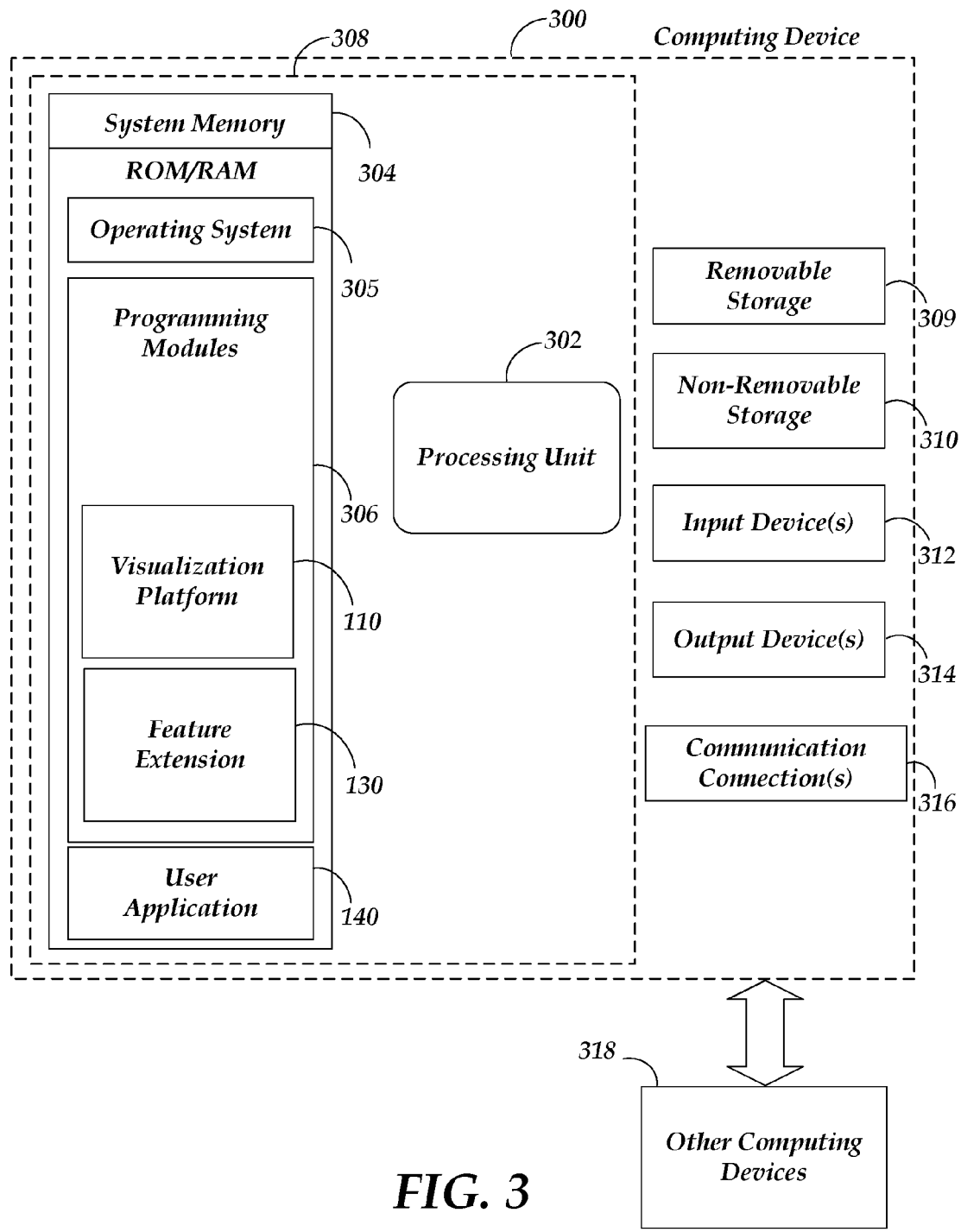
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include visualization platform 110 and/or feature extension 130. Operating system 305, for example, may be suitable for controlling computing device 300's operation. In one embodiment, programming modules 306 may include user application 140. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. visualization platform 110 and/or feature extension 130) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing an extensibility framework, the method comprising:
    instantiating a visualization platform using a platform-independent programming code, the visualization platform comprising an object manager and further comprising a shared core including at least a plurality of software libraries for providing interactive visualizations;
    registering at least one feature extension with the visualization platform, wherein the visualization platform comprises an intermediate interface between the at least one feature extension and at least one user application, the at least one feature extension comprising an add-on operative on an operating system supporting the platform independent programming code, the at least one user application not supporting the platform independent programming code;
    receiving a request to create at least one object from the at least one user application;
    creating the at least one object by the visualization platform;
    determining whether the request is associated with the at least one feature extension;
    in response to determining that the request is associated with the at least one feature extension:
        receiving at least one object modification from the at least one feature extension,
        verifying that the at least one object modification is compatible with a type of the at least one object; and
        modifying the at least one object according to the compatible at least one object modification; and
    rendering the at least one object on a display device.

2. The method of claim 1, wherein the at least one user application renders the object on the display device.

3. The method of claim 1, further comprising:
    receiving at least one second object modification from the at least one user application; and
    modifying the object according to the at least one second object modification.

4. The method of claim 1, wherein receiving the request comprises receiving a visualization type and at least one data value;
    wherein the object comprises a visualization object of the requested visualization type; and
    wherein the visualization platform comprises at least one default drawing instruction for the visualization type and the at least one data value.

5. The method of claim 1, wherein the at least one user application is operative to determine a plurality of objects the visualization platform is operative to create and display the plurality of objects to a user.

6. The method of claim 5, wherein determining the plurality of objects the visualization platform is operative to create comprises retrieving a list of the plurality of objects from the visualization platform.

7. The method of claim 5, wherein determining the plurality of objects the visualization platform is operative to create comprises searching at least one location for the at least one feature extension.

8. The method of claim 1, wherein determining whether the request is associated with the at least one feature extension comprises determining whether the at least one feature extension comprises at least one of the following: at least one data value and at least one drawing instruction.

9. The method of claim 1, wherein the at least one object modification from the at least one feature extension comprises a drawing instruction overriding at least one drawing instruction used by the visualization platform to create the object.

10. The method of claim 1, wherein the at least one object modification from the at least one feature extension comprises a drawing instruction adding at least one drawing instruction to be used by the visualization platform to create the object.

11. The method of claim 1, wherein the at least one object modification from the at least one feature extension comprises a plurality of data points to be displayed on the object.

12. A system for providing application extensibility, the system comprising:
    a memory storage; and
    a processing unit coupled to the memory storage, wherein the processing unit is operative to:
        instantiate a visualization platform using a platform-independent programming code, the visualization platform comprising an object manager and further comprising a shared core including at least a plurality of software libraries for providing interactive visualizations;
        locate at least one feature extension operative for use with the visualization platform, wherein the visualization platform comprises an intermediate interface between the at least one feature extension and at least one user application, the at least one feature extension comprising an add-on operative on an operating system supporting the platform-independent programming code, the at least one user application not supporting the platform-independent programming code;
receive a request to create at least one object from the at least one user application;
create the at least one object;
determine whether the request is associated with the at least one feature extension;
in response to determining that the request is associated with the at least one feature extension:
receive at least one object modification from the at least one feature extension,
verify that the at least one object modification is compatible with a type of the at least one object, and
modify the object according to the compatible at least one object modification; and
rendering the object on a display device.

13. The system of claim 12, further comprising:
storing the object in a memory location of the memory storage associated with the visualization platform; and
controlling access to the memory location by the application and the feature extension.

14. The system of claim 12, wherein being operative to locate the at least one feature extension operative for use with the visualization platform comprises being operative to search a predefined memory location of the memory storage for the at least one feature extension.

15. The system of claim 12, further operative to:
execute at least one of a plurality of software operating systems; and
utilize the at least one feature extension regardless of the executing at least one of the plurality of software operating systems.

16. The system of claim 12, wherein the created object is shared with a plurality of user applications.

17. The system of claim 12, further comprising being operative to provide a list of objects the visualization platform is operative to create to the at least one user application, wherein the list of objects the visualization platform is operative to create comprises at least one object requiring the at least one object modification from the at least one feature extension.

18. The system of claim 17, wherein being operative to provide a list of objects the visualization platform is operative to create to the at least one user application comprises being operative to determine whether the at least one user application is compatible with the at least one feature extension; and
in response to determining that the at least one user application is not compatible with the at least one feature extension, withholding at least one object associated with the at least one feature extension from the list of objects the visualization platform is operative to create.

19. The system of claim 12, wherein being operative to modify the object according to the at least one object modification comprises being operative to receive at least one drawing instruction from the at least one feature extension operative to override at least one drawing instruction used to create the object.

20. A computer-readable storage device which stores a set of instructions which when executed performs a method for providing an application extensibility framework, the method executed by the set of instructions comprising:
instantiating a visualization platform using a platform-independent programming code, the visualization platform comprising an object manager and further comprising a shared core including at least a plurality of software libraries for providing interactive visualizations;
registering at least one feature extension with the visualization platform, wherein the visualization platform comprises an intermediate interface between the at least one feature extension and at least one user application, the at least one feature extension comprising an add-on operative on an operating system supporting the platform-independent programming code, the at least one user application not supporting the platform-independent programming code;
providing a list of objects that the visualization platform is operative to create to the at least one application, wherein the list of objects comprises at least one object the visualization platform requires the at least one feature extension to create;
receiving a request to create at least one of the list of objects from at least one application, wherein the request comprises a user selection from the list of objects provided to the application;
creating the at least one requested object according to at least one drawing instruction provided by the visualization platform and associated with the requested object type;
determining whether the requested object is associated with the at least one feature extension;
in response to determining that the request is associated with the at least one feature extension, determining whether the at least one feature extension is compatible with the at least one application, wherein determining whether the at least one feature extension is compatible with the at least one application comprises at least one of the following: determining whether the at least one application comprises a compatible release version and determining whether the at least one application comprises a license to use the at least one feature extension;
in response to determining that the at least one feature extension is compatible with the at least one application:
receiving at least one object modification from the at least one feature extension, wherein the at least one object modification comprises at least one of the following: a drawing instruction override and at least one additional drawing element,
verifying that the at least one object modification is compatible with a type of the at least one object; and
modifying the object according to the compatible at least one object modification; and
rendering the object on a display device by the application.

* * * * *